United States Patent
Benjamin (10) Patent No.: US 7,783,778 B2
(45) Date of Patent: Aug. 24, 2010

(54) MODEL-BASED METHOD AND APPARATUS FOR DETERMINING VIRTUAL PRIVATE NETWORK TOPOLOGIES

(75) Inventor: Shai Benjamin, Dobbs Ferry, NY (US)

(73) Assignee: EMC Corporation, Hopkinton, MA (US)

( * ) Notice: Subject to any disclaimer, the term of this patent is extended or adjusted under 35 U.S.C. 154(b) by 1591 days.

(21) Appl. No.: 10/950,150

(22) Filed: Sep. 24, 2004

(65) Prior Publication Data

US 2005/0071681 A1    Mar. 31, 2005

Related U.S. Application Data

(60) Provisional application No. 60/505,802, filed on Sep. 25, 2003.

(51) Int. Cl.
 *G06F 15/16* (2006.01)
(52) U.S. Cl. .................. 709/238; 709/239; 709/240; 709/242; 709/245
(58) Field of Classification Search ............... 709/238, 709/239, 240, 242; 370/292
See application file for complete search history.

(56) References Cited

U.S. PATENT DOCUMENTS

| | | | |
|---|---|---|---|
| 6,374,303 B1 | 4/2002 | Armitage et al. | |
| 6,874,022 B1 | 3/2005 | Carew et al. | |
| 6,990,518 B1 | 1/2006 | Secer | |
| 2002/0186664 A1 | 12/2002 | Gibson et al. | |
| 2002/0191541 A1* | 12/2002 | Buchanan et al. | 370/230 |
| 2005/0091482 A1* | 4/2005 | Gray et al. | 713/151 |
| 2007/0064704 A1* | 3/2007 | Balay et al. | 370/392 |
| 2008/0127316 A1* | 5/2008 | Golan et al. | 726/5 |

OTHER PUBLICATIONS

E. Rosen & Y. Rekhter, RFC 2547- BGP/MPLS VPNS, Internet Network Working Group, Mar. 1999.

E. Rosen, RFC 3031-Multiprotocol Label Switching Architecture, Internet Network Working Group, Jan. 2001.

* cited by examiner

*Primary Examiner*—Djenane M Bayard
(74) *Attorney, Agent, or Firm*—Krishnendu Gupta; Joseph D'Angelo (57) ABSTRACT

A method and apparatus for determining and identifying types of Virtual Private Networks is disclosed. The method comprises the steps of representing the network by a model containing a plurality of object classes, evaluating an import/export relationship of a first one and a second one of the object classes and identifying the network type based on the evaluated relationship.

44 Claims, 9 Drawing Sheets

IMPORT/ EXPORT

MODEL-BASED METHOD AND APPARATUS FOR DETERMINING VIRTUAL PRIVATE NETWORK TOPOLOGIES

CLAIM OF PRIORITY

This application claims the benefit, pursuant to 35 USC §119(e), of the earlier filing date of the Provisional Patent Application Ser. No. 60/505,802, entitled "Model-Based Discovery of Multi-Protocol Label Switching Virtual Private Networks, filed on Sep. 25, 2003, the contents of which are incorporated by reference herein.

This application is related to concurrently-filed:

U.S. patent application Ser. No. 10/949,589, entitled "Model-Based Method and Apparatus for Determining MPLS Network Properties;" and U.S. patent application Ser. No. 10/949,415, entitled "Method and Apparatus for Modeling and Analyzing MPLS and Virtual Private Networks," the contents of both of which are incorporated by reference herein.

FIELD OF THE INVENTION

The invention relates generally to computer networks, and more specifically to systems and methods for modeling and identifying Virtual Private Network (VPN) topologies, memberships and member roles.

BACKGROUND OF THE INVENTION

The concepts, terms, and acronyms of Virtual Private Network (VPN) are well-known in the art. For example, the memorandum entitled *BGP/MPLS VPNs*, E. Rosen and Y. Rekhter, RFC 2547, March 1999, Internet Engineering Task Force (IETF), is an example of the literature regarding VPNs.

The ability to analyze VPNs has been limited by the network models that have been employed. For example, one model uses a Common Information Model (CIM) that defined objects and relationships. (see *Common Information Model: Implementing the Object Model for Enterprise Management*, Bumpus, et al., John Wiley & Sons, December 1999, ISBN: B00007FY8X). This model is limited by the pre-defined and standard objects and relationships defined in the Common Information Model (CIM). For example, one cannot easily capture the relationship between a VPN Routing and Forwarding Table (VRF) and a RouteTarget (RT). (See, for example, *BGP/MPLS VPNs*, E. Rosen and Y. Rekhter, RFC2547bis, IETF, July 2000.)

In a second model, the definition of MPLS and VPN Management Information Bases (MIBs) are established. (See, for example, *SNMP, SNMPv2, SNMPv3, and RMON 1 and 2 (3rd Edition)*, William Stallings, Addison-Wesley Pub Co, December 1998, pages 71-162 ISBN: 0201485346). However, MIBs typically do not capture relationships between objects. For example the MPLS end-to-end Label-Switched Path (LSP) is difficult to represent explicitly in a MIB.

The lack of a systematic model specifically suited for the MPLS and/or VPN objects and relationships limits several forms of important analysis. For example, it is difficult to determine the members of each VPN; what is the role of each VPN member; what is the type of each VPN or sub-set of the VPN.

Hence there is a need in the industry for a method and system for analyzing VPN systems that overcomes known deficiencies in identifying VPN components and the VPN topology.

SUMMARY OF THE INVENTION

A method and apparatus for determining and identifying types of Virtual Private Networks is disclosed. The method comprises the steps of representing the network by a model containing a plurality of object classes, evaluating an import/export relationship of a first one and a second one of the object classes and identifying the network type based on the evaluated relationship.

DETAILED DESCRIPTION OF THE FIGURES

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

Figure 1:
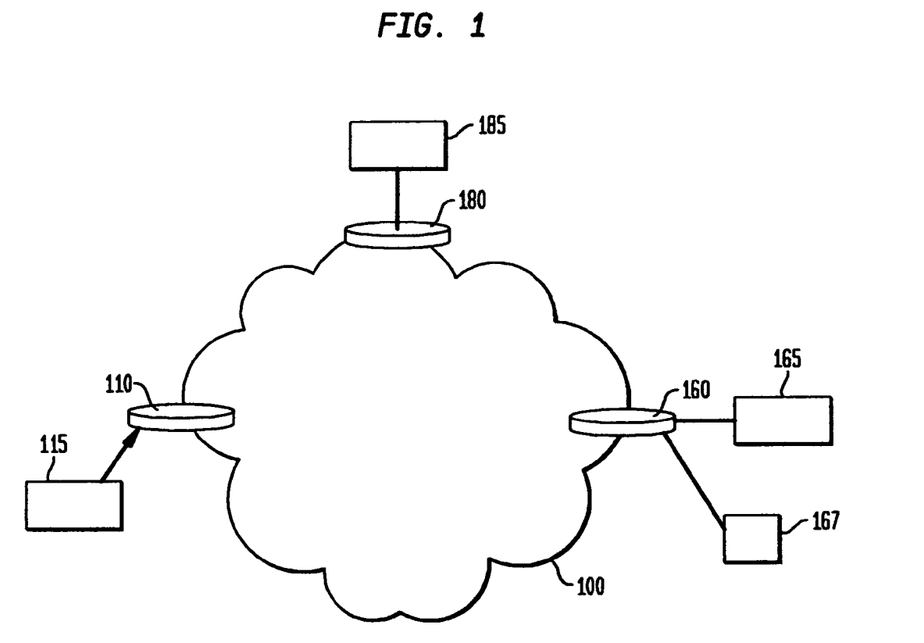
FIG. 1 illustrates a logical view of a conventional VPN network.

FIG. 1a illustrates an exemplary representation of a virtual private network 100 composed of components, referred to as provider edge routers (PE), 110, 160 and 180 that represent the means for providing information items to, and receiving information items from, network 100. Also shown are Customer Edge (CE) nodes or routers 115, 165, 167 and 185, which are in communication with corresponding provider edge nodes 110, 160 and 180. The CE nodes 115, 165, 167 and 185 represent components or routers located at the customer premises that are directly connected, at either a network Layer 2 or Layer 3 level (of the OSI stack) to the ingress and egress provider edge routers 110, 160 and 180. Internal routers, which are not shown, are responsible for converting the packet or frame structure from the one used to communicate with CE routers 115, 165, 167, and 185 to the packet or frame structure used internally by an associated private network.

A CE router or node is typically connected to only one provider edge router or node. However, as shown in this illustrative case, provider edge router 160 is connected to CE router 165 and CE router 167. Hence, CE router 185, for example, may communicate privately with CE router 165 and/or 167. The communication between the CE nodes and the PE nodes may take place using any Layer 2 or Layer 3 network protocol.

VPN routing and addressing structures are created for each customer in the PE and internal nodes (not shown), and designate the path assigned to the customer. VPN Routing and Forwarding Tables (VRFs) are a well-known means for creating virtual private networks. The VRFs exchange routes using, for example, Multiprotocol Border Gateway Protocol (MP-BGP). The typical attributes of a VRF instance include a name, associated interfaces, route-distinguisher, import route-targets, export route-targets, and a routing table. RouteTargets (RTs) are identifiers associated with a set of routes through the network 100. The identifiers are used by the VRFs to control the importing or the exporting of routes to other VRFs. Each VRF, thus, can export or import routes or paths via a list of export or import RTs. In this illustrative case, CE 115 for example, may communicate privately with CE 167 by the appropriate selection of VRFs in each edge router or node and the not shown internal routers or nodes. In one aspect of the invention, a Route-Distinguisher may also be specified that provides a distinguishing characteristic for the specific route. This distinguishing characteristic is used when duplicate addresses are encountered.

Figure 2:
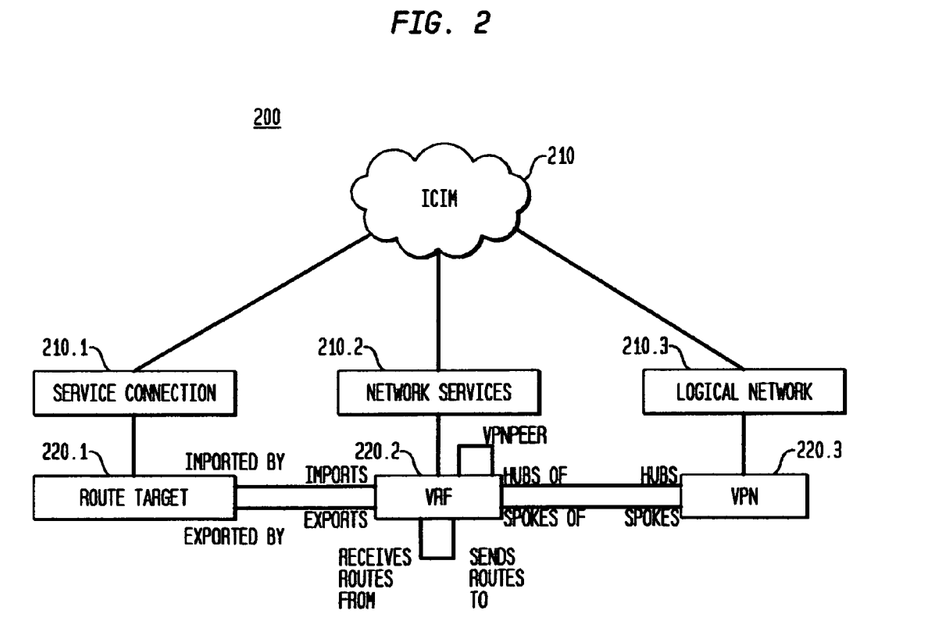
FIG. 2 illustrates a model representation of VPNs in accordance with the principles of the invention.

FIG. 2 illustrates an exemplary abstract model 200 of a VPN network in accordance with the principles of the invention. The VPN model shown is an extension of a known network models 210, such as the SMARTS® InCharge™ Common Information Model (ICIM), or similarly defined or pre-existing CIM-based model. SMARTS and Incharge are trademarks of System Management ARTs, Inc., having a principle place of business in White Plains, N.Y., USA. CIM models are known to represent selected ones of the physical network components, e.g., nodes, routers, computer systems, disk drives, etc., and/or logical network components, e.g., software, application software, ports, disk drive designation, etc., by defining object classes, which are a representation of the component. Those network components that are selected for representation in the model are hereinafter referred to as managed components. The representation of the managed components includes aspects or properties of the component. Similarly, the relationships between the managed components are also represented and contained in the model.

With regard to the ICIM, this model defines object classes such as ServiceConnection 210.1, NetworkService 210.2, and LogicalNetwork 210.3 that are representative of generic concepts or components of service connections, network services, and logical networks, respectively.

In accordance with the principles of the invention with regard to modeling VPNs, object class RouteTargets 220.1 is selected as a type of service connection, VRF 220.2 is designated as a type of network service, and VPN 220.3 is designated as a type of logical network. Object classes RouteTargets, VRF, VPN are hereinafter referred to as RouteTargets, VRF, VPN unnecessary technical terminology. Those skilled in the art would recognize that such references refer to the respective object classes. Furthermore, the terms RouteTarget and RouteTargets may also refer to an element(s) or instances of the object class RouteTargets. Similar terminology is also used with regard to VRF, VRFs, VPN and VPNs.

The VPN model shown further illustrates the relationship between RouteTargets 210.1 and VRFs 220.2, which are represented with the classes Imported By/Imports and Exported by/Exports. Similarly, the relationship between VRFs and the VPN may be expressed as HubsOf/Hubs and SpokesOf/Spokes.

It would be recognized by those skilled in the art that the information to populate or determine instances of the object classes, i.e., representation of components, and the relationship between components, i.e., representation of component relationships, of the models defined herein may be pre-loaded or predetermined or may be determined dynamically by importation, discovery or provided by one or more sources of such information, e.g., Simple Network Management Protocol (SNMP) MIBs, MPLS-LSR-MIB, MPLS forwarding tables, MPLS-VPN-MIB. Similarly, manual commands such as Command Line Interface (CLI) at network devices, Show commands that retrieve and display information regarding forwarding-table, VRFs, BGP and MBGP sessions, may be used to provide information to populate the object classes shown. Each of these sources of information are representative of communications that may occur dynamically over the physical network that the model overlays, i.e., layered over, and should not be considered the only methods to dynamically populate the object classes shown.

Figure 3:
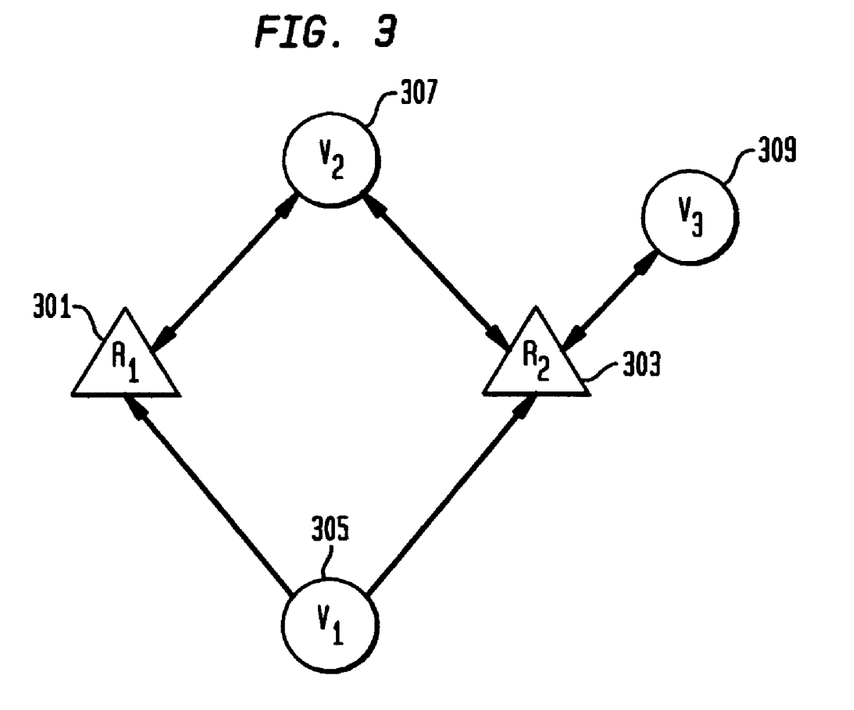
FIG. 3 illustrates an example of a model-ed representation of a VPN.

FIG. 3 illustrates an example of an import/export relationship between VRFs and RouteTargets for a VPN in accordance with the principles of the invention. In this illustrated example, VRFs 305, 307, 309 have import/export relationships with RTs 301 and 303 that are tabulated in Table 1.

TABLE 1

| VRF | Imports | Exports |
| --- | --- | --- |
| V1 | — | RT1, RT2 |
| V2 | RT1, RT2 | RT1 |
| V3 | RT2 | RT3 |

The ImportedBy/Imports and the ExportBy/Exports relationships shown in FIG. 3 may be expressed as:

$Im(R_1)$ is the set $\{V_2\}$; [1]

$Ex(R_1)$ is the set $\{V_1, V_2\}$; [2]

$Im(R_2)$ is the set $\{V_2, V_3\}$; and [3]

$Ex(R_2)$ is the set $\{V_1, V_3\}$ [4]

Where $Im(R_x)$ is the set of VRFs that import the RouteTarget $R_x$; and $Ex(R_x)$ is the set of VRFs that export the RouteTarget $R_x$.

Figure 4A:
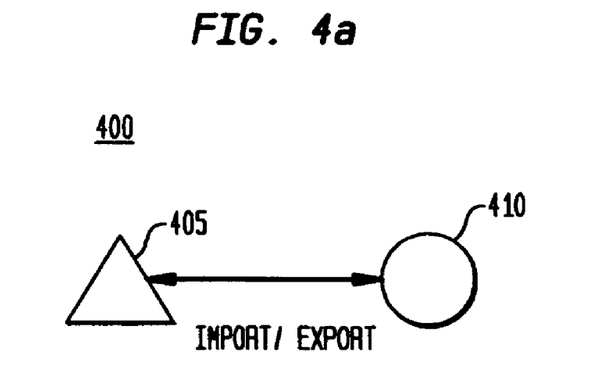
FIGS. 4a-4d illustrate examples of model-ed representations of VPN topologies.

FIG. 4a illustrates a representation 400 of the relationship between VRFs and RTs in a Full-Mesh (FM) topology in accordance with an aspect of the principles of the invention. A Full-Mesh topology allows routing of packets from any node in the VPN to any other node in the VPN. Hence, in accordance with the principles of the invention, in an FM topology Route Target (RT) 405 is such that it is both imported and exported by the VRF 410. This may be expressed as:

$Im(R)=Ex(R)$ [5]

Figure 4B:
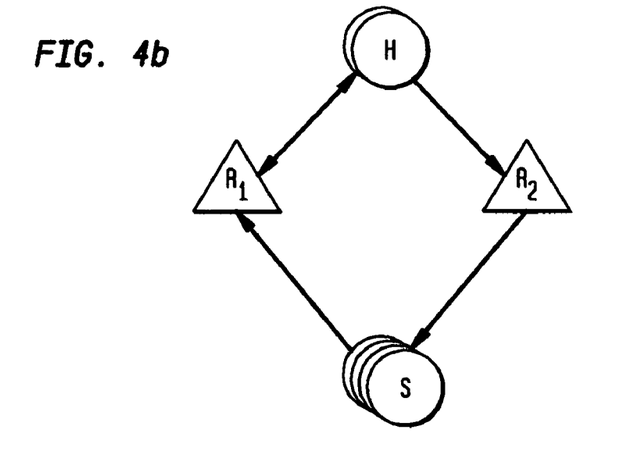
Figure 4C:
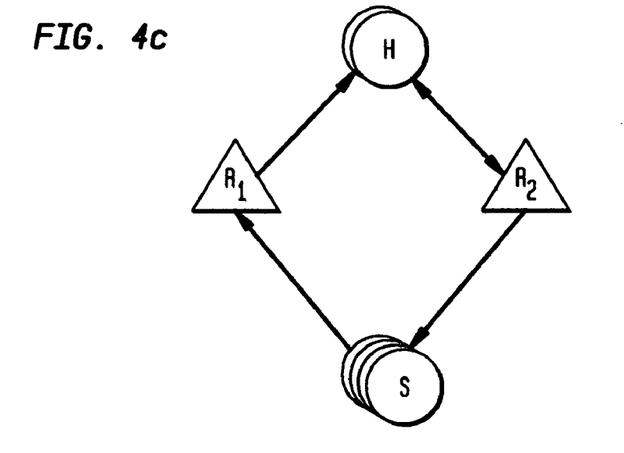
Figure 4D:
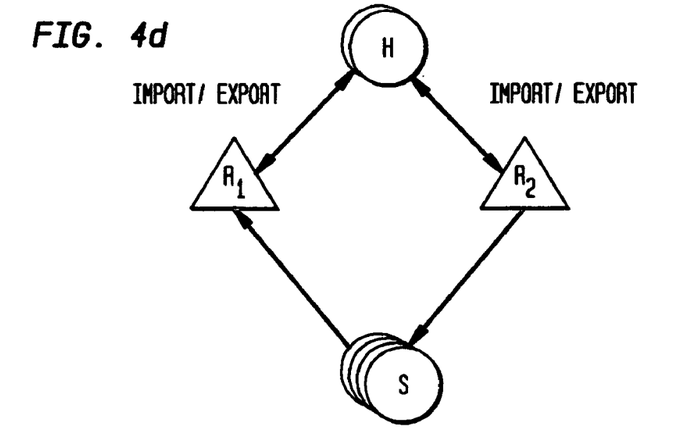

FIGS. 4b-4d illustrate graphic representations of the relationship between VRFs and RTs in Hub-and-Spoke (H-S) topologies in accordance with the principles of the invention. In an H-S topology, hub VRFs may communicate with either hub or spoke VRFs, whereas spoke VRFs can only communicate with hub VRFs. An H-S VPN topology may be determined when one of the following configurations is satisfied:

1. Hub VRFs export $R_2$ and both import and export $R_1$ while spoke VRFs import $R_2$ and export $R_1$. See FIG. 4b;
2. Hub VRFs both import and export $R_2$ and import $R_1$ while spoke VRFs import $R_2$ and export $R_1$. See FIG. 4c; or
3. Hub VRFs both import and export $R_2$ and both import and export $R_1$ while spoke VRFs import $R_2$ and export $R_1$. See FIG. 4d.

Accordingly, an H-S topology may be determined when, for an ordered pair of Route Targets, denoted as $R_1$ and $R_2$, the following conditions are satisfied:

1. The import set of $R_1$ is identical to the export set of $R_2$; and
2. The set of VRFs that export $R_1$ but do not import $R_1$ is identical to the set of VRFs that import $R_2$ but do not export $R_2$; and
3. The export set of $R_1$ is not identical to the import set of $R_2$, or there is at least one VRF that both imports and exports $R_1$.

These criteria may be expressed as:

$$\text{Im}(R_1)=\text{Ex}(R_2); \text{ and} \quad [6]$$

$$\text{Ex}(R_1)\backslash\text{IM}(R_1)=\text{Im}(R_2)\backslash\text{Ex}(R_2); \text{ and} \quad [7]$$

$$\text{Ex}(R_1)\neq\text{Im}(R_2) \text{ OR } \text{Ex}(R_1)\cap\text{Im}(R_1)\neq\text{Empty set} \quad [8]$$

In another aspect of the invention, the members of an H-S topology may then be determined as those members of the union of the import and the export sets of $R_1$. In this aspect of the invention, the spoke members may be determined as those members of the set of VRFs that export but do not import $R_1$, and the remaining members of the VPN are hub members.

Figure 5:
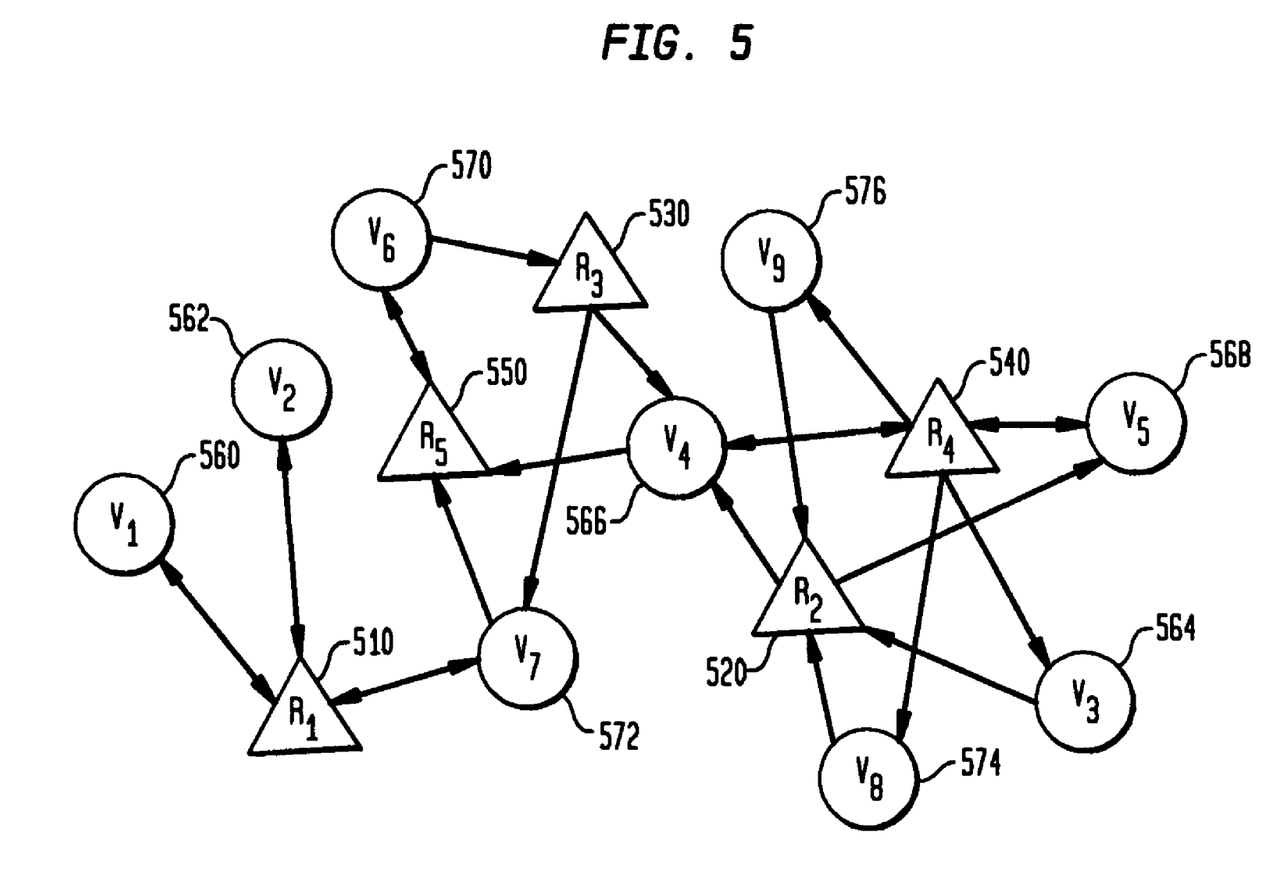
FIG. 5 illustrates an example of identifying VPN topologies in accordance with the principles of the invention.

FIG. 5 illustrates a VRF-RT model used as an example for determining VPN topologies, and element members, in accordance with the principles of the present invention. In this illustrative example, the ImportedBy/Imports and ExportedBy/Exports relationships between RTs 510-550, i.e., $R_1$-$R_5$, and VRFs 560-576, i.e., $V_1$-$V_9$, are graphically illustrated using an arrow notation wherein the arrowhead denotes importing/exporting. Utilizing the notation discussed previously, RouteTarget 520 ($R_2$), for example, imports VRF 564 ($V_3$), VRF 574 ($V_8$) and VRF 576 ($V_9$) and exports VRF 566 ($V_4$) and VRF 568 ($V_5$). The import and export sets with respect to Route Targets $R_1$-$R_5$ may be determined as shown in Table 2 as:

TABLE 2

| Route Target | Im(R) | Ex(R) |
|---|---|---|
| $R_1$ | $\{V_1, V_2, V_7\}$ | $\{V_1, V_2, V_7\}$ |
| $R_2$ | $\{V_4, V_5\}$ | $\{V_3, V_8, V_9\}$ |
| $R_3$ | $\{V_4, V_7\}$ | $\{V_6\}$ |
| $R_4$ | $\{V_3, V_4, V_5, V_8, V_9\}$ | $\{V_4, V_5\}$ |
| $R_5$ | $\{V_6\}$ | $\{V_4, V_6, V_7\}$ |

In this case, the import set and the export set associated with $R_1$ are identical and, hence, satisfy the conditions of equation 1. Thus, VRFs 960, 962, 972 (i.e., $V_1$, $V_2$, $V_7$) constitute a VPN of a Full-Mesh topology.

A Hub-and-Spoke topology may be determined between Route Target 920 and 930 (i.e, $R_2$ and $R_4$, respectively) as the following conditions are satisfied:

$$\text{Im}(R_2)=\{V_4,V_5\}=\text{Ex}(R_4);$$

$$\text{Ex}(R_2)\backslash\text{Im}(R_2)=\{V_3,V_8,V_9\}\backslash\{V_4,V_5\}=\{V_3,V_8,V_9\} \text{ and}$$

$$\text{Im}(R4)\backslash\text{Ex}(R4)=\{V_3,V_4,V_5,V_8,V_9\}\backslash\{V_4,V_5\}=\{V_3,V_8,V_9\}; \text{ and}$$

$$\text{Ex}(R_2)=\{V_3,V_8,V_9\}\neq\{V_3,V_4,V_5,V_8,V_9\}=\text{Im}(R_4).$$

Accordingly, VRFs 964, 966, 968, 974, 976 (i.e., $V_3$, $V_4$, $V_5$, $V_8$ and $V_9$) constitute a Hub-and-Spoke topology. In a similar manner, it may be determined that the ordered pair of Route Targets 950, 920 ($R_5$, $R_2$) also constitute a Hub-and-Spoke topology.

The spoke members of a H-S topology may be determined as those members of the set of VRFs that export but do not import the first Route Target of the ordered pair of Route Targets and the remaining members of the H-S topology VPN are then deemed hub VRFs.

$$\text{Ex}(R_x)\backslash\text{Im}(R_x) \quad [9]$$

where $R_x$ is the first RT of the ordered pair

Thus, in the H-S topology determined from the ordered pair of Route Targets 920, 940 ($R_2$, $R_4$), the spoke members may be determined to be VRFs $V_3$, $V_8$ and $V_9$ and the hub members are VRFs $V_3$ and $V_4$. Similarly, in the H-S VPN topology determined from the ordered pair of Route Targets $R_5$, $R_2$, the spoke members are VRFs $V_4$ and $V_7$ and the hub member is VRF $V_6$.

In another aspect of the invention, not all pairings of Route Targets need be tested. In this aspect of the invention, the pairing of Route Targets may be reduced by considering the following criteria:
1. Route Targets that define a Full-Mesh VPN need not be evaluated; or
2. For a selected RouteTarget, only RouteTargets that are exported by some VRF that is in the import set of the given RouteTarget need be evaluated.

In accordance with this aspect of the invention with regard to the above example, $R_1$ need not be evaluated with regard to the remaining RTs as $R_1$ was determined to be in a Full-Mesh network. Similarly, $R_3$ and $R_4$ need not be evaluated with regard to each other as they fail to satisfy condition 2.

Figure 6A:
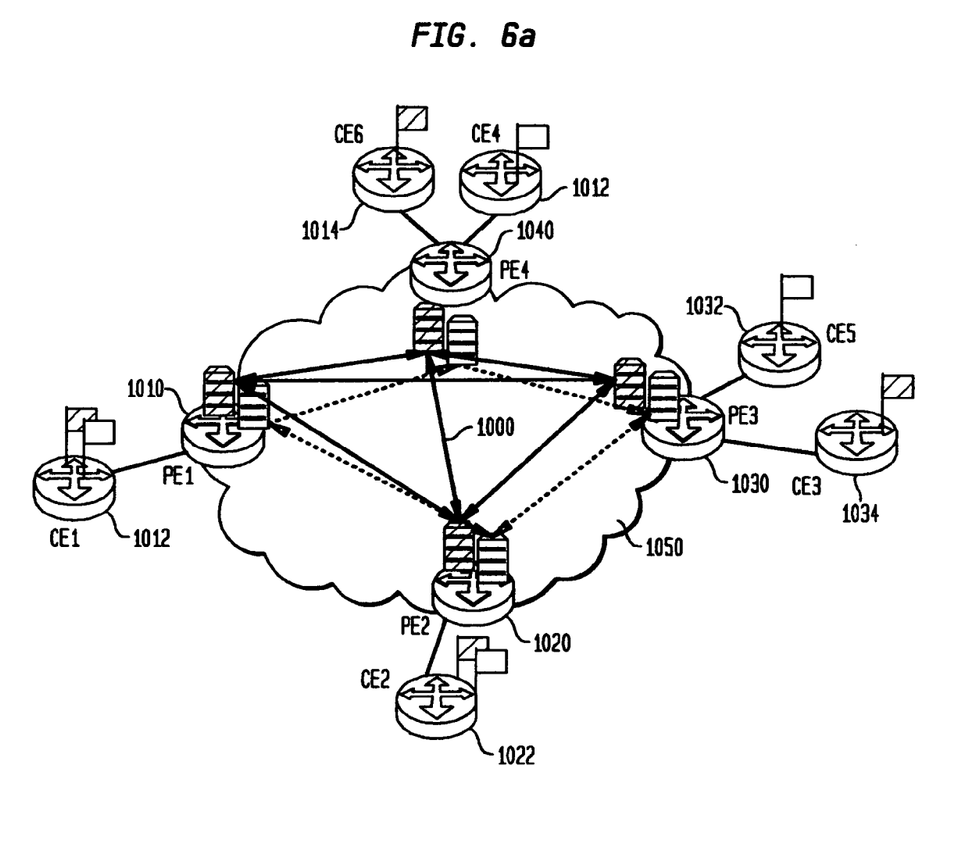
FIGS. 6a-6d illustrate an example of the application of the VPN model with regard to a physical network in accordance with the principles of the invention.

FIGS. 6a-6d illustrate an application of the present invention with regard to a physical network. FIG. 6a illustrates an example of two MPLS VPNs 600 and 650 wherein VPN 600 is in a Full Mesh configuration and VPN 650 is in a Hub-and-Spoke configuration. And will be determining in accordance with the principles of the invention. FIG. 6a illustrates that VPN 600 communicates, through provider edge nodes 610-640, to customer edge nodes 612, 622, 632 and 642, respectively, and VPN 650 communicates, through provider edge nodes 610-640, to consumer edge nodes 612, 622, 634 and 644, respectively.

Table 3 tabulates the imports and exports of the RTs for each VRF shown in FIG. 6a. This information is stored at the respective provider edge node where the VRFs reside.

TABLE 3

| VRF | Node | Imports | Exports |
|---|---|---|---|
| VRF1 | PE1 | RT1A | RT1B |
| VRF1 | PE2 | RT1A, RT1B | RT1A |
| VRF1 | PE3 | RT1A | RT1B |
| VRF1 | PE4 | RT1A, RT1B | RT1A |
| VRF2 | PE1 | RT2 | RT2 |
| VRF2 | PE2 | RT2 | RT2 |
| VRF2 | PE3 | RT2 | RT2 |
| VRF2 | PE4 | RT2 | RT2 |

Figure 6B:
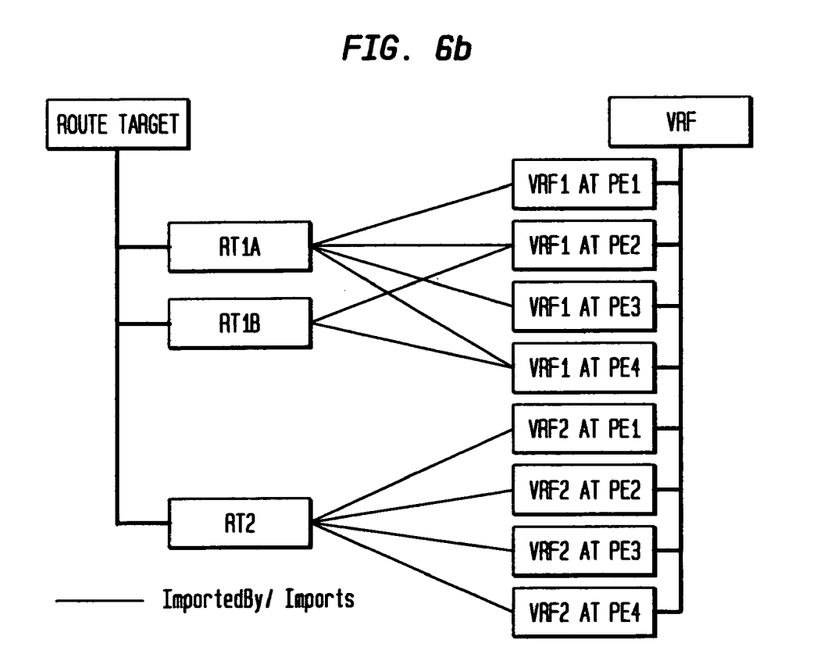
Figure 6C:
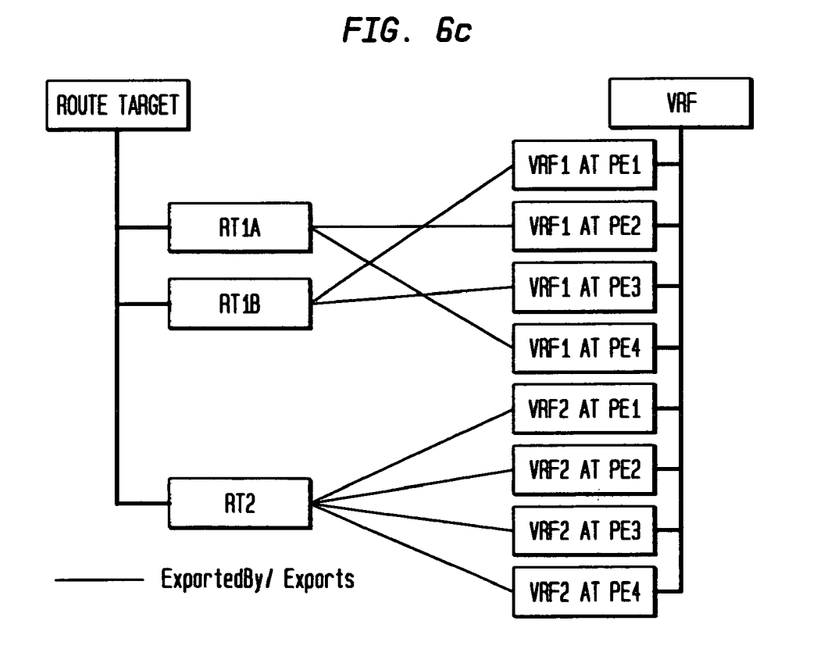

FIGS. 6b and 6c illustrate the ImportedBy/Imports and ExportedBy/Exports relationships of VRFs with respect to RTs in the exemplary VPNs 600 and 650 shown in FIG. 6a. FIG. 6b illustrates that RT1A is imported by each VRF1 in each provider edge node 610-640 ($PE_1$-$PE_4$), while RT1B is imported by VRF1 at provider edge nodes 620 and 640 (i.e., $PE_2$ and $PE_4$). Similarly, RT2 is imported by VRF2 at each provider edge node 610-640 ($PE_1$-$PE_4$). FIG. 6c illustrates that RT1A is exported by VRF1 at provider edge nodes 620 and 640, while RT1B is exported by VRF1 at provider edge nodes 610 and 630. RT2, on the other hand, is exported by each VRF2 at each provider edge node 610-640. Table 4 tabulates the Imported By and Exported By relationships, wherein $V_{ij}$ represents the instantiation of $VRF_i$ at $PE_j$.

TABLE 4

|      | Im(R)                          | Ex(R)                          |
| ---- | ------------------------------ | ------------------------------ |
| RT1A | $\{V_{11}, V_{12}, V_{13}, V_{14}\}$ | $\{V_{12}, V_{14}\}$           |
| RT1B | $\{V_{12}, V_{14}\}$           | $\{V_{11}, V_{13}\}$           |
| RT2  | $\{V_{21}, V_{22}, V_{23}, V_{24}\}$ | $\{V_{21}, V_{22}, V_{23}, V_{24}\}$ |

Figure 6D:
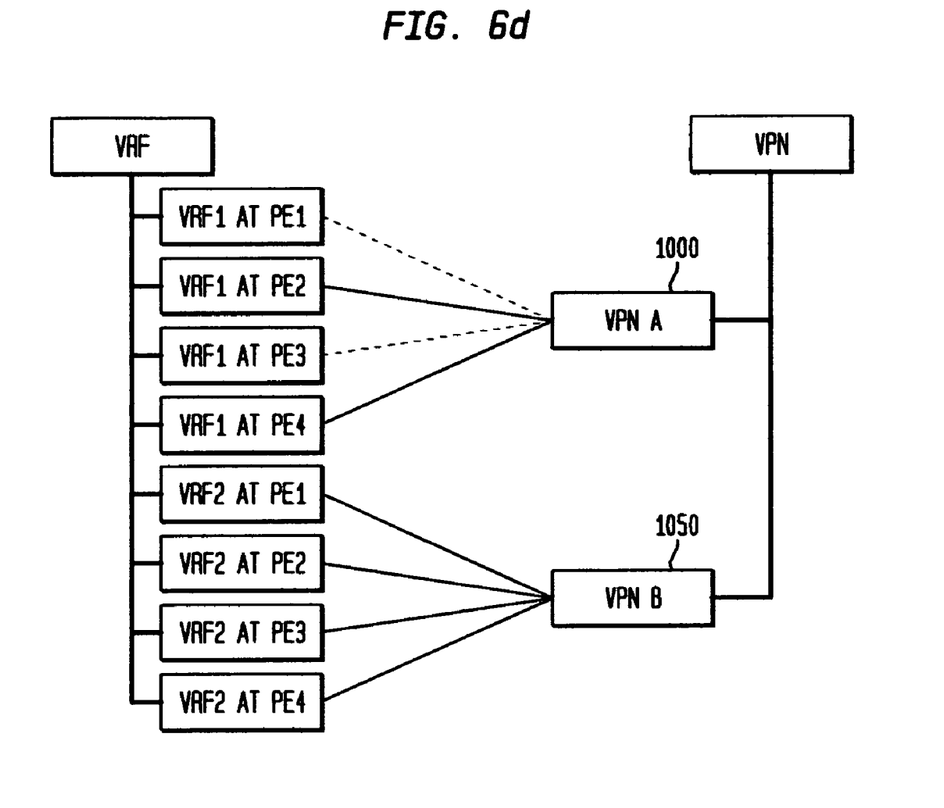

Evaluating the entries shown in Table 4, utilizing the criteria shown in equations 5-8, it may be determined that VPN 600 is an FM-type VPN as RT2 is imported and exported by all VRF2s. Further, VPN 650 may be determined to be a H-S type VPN. It may further be determined that $PE_1$ 610 and $PE_3$ 630 are spoke VRFs and $PE_2$, 620 and $PE_4$, 640 are be hub VRFs. FIG. 6d illustrates the VRFs associated with the determined VPN types.

Figure 7:
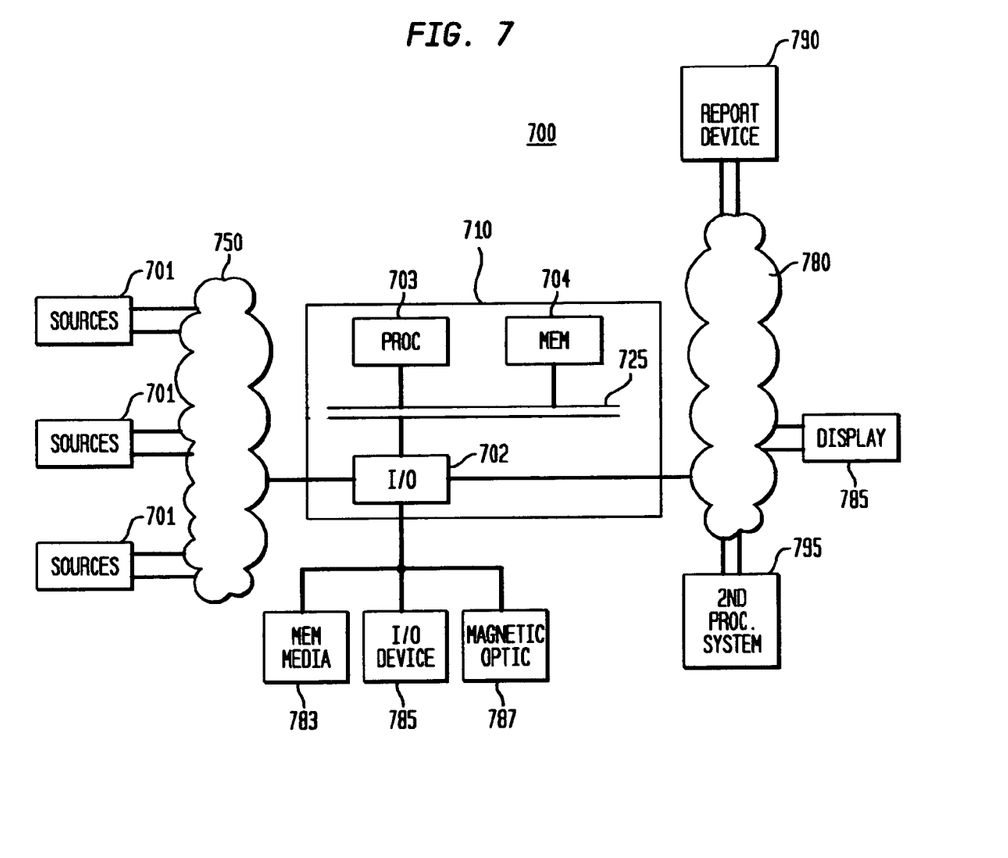
FIG. 7 illustrates a system for implementing the processing shown herein.

FIG. 7 illustrates an exemplary embodiment of a system 700 that may be used for implementing the principles of the present invention. System 700 may contain one or more input/output devices 702, processors 703 and memories 704. I/O devices 702 may access or receive information from one or more sources or devices 701. Sources or devices 701 may be devices such as routers, servers, computers, notebook computer, PDAs, cells phones or other devices suitable for transmitting and receiving information responsive to the processes shown herein. Devices 701 may have access over one or more network connections 750 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 702, processors 703 and memories 704 may communicate over a communication medium 725. Communication medium 725 may represent, for example, a bus, a communication network, one or more internal connections of a circuit, circuit card or other apparatus, as well as portions and combinations of these and other communication media. Input data from the client devices 701 is processed in accordance with one or more programs that may be stored in memories 704 and executed by processors 703. Memories 704 may be any magnetic, optical or semiconductor medium that is loadable and retains information either permanently, e.g. PROM, or non-permanenty, e.g., RAM. Processors 703 may be any means, such as general purpose or special purpose computing system, such as a laptop computer, desktop computer, a server, handheld computer, or may be a hardware configuration, such as dedicated logic circuit, or integrated circuit. Processors 703 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In a one aspect, the processes shown herein may be represented by computer readable code stored on a computer readable medium. The code may also be stored in the memory 704. The code may be read or downloaded from a memory medium 783, an I/O device 785 or magnetic or optical media, such as a floppy disk, a CD-ROM or a DVD, 787 and then stored in memory 704.

Information from device 701 received by I/O device 702, after processing in accordance with one or more software programs operable to perform the functions illustrated herein, may also be transmitted over network 780 to one or more output devices represented as display 785, reporting device 790 or second processing system 795.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. For example, although the present invention has been disclosed with regard to VPNs of the Full Mesh and Hub-and-Spoke topologies, the techniques described herein are not limited to the topologies shown. For example, Partial Mesh topologies are known in the art as being Hub-and-Spoke topologies with multiple hubs. In addition, Spoke-and-Spoke topologies may similarly be determined. Accordingly, it would be within the knowledge of those skilled in the art to expand the teachings described herein to other topologies, which have been contemplated and are considered within the scope of the invention. Similarly, the invention described herein describes a generic modeling approach for VPNs. However, the invention is not limited by the model discussed, and used as an example, or the specific proposed modeling approach described herein.

What is claimed is:

1. A method for determining a type of Virtual Private Network (VPN) comprising the steps of: representing the network by a model containing a plurality of object classes; evaluating an import/export relationship of a first one and a second one of the object classes; and identifying the network type based on the evaluated relationship; wherein the first object class is a RouteTarget; and wherein the step of evaluating an import/export relationship comprises the step of:

determining $Im(R_1) = Ex(R_2)$; and $Ex(R_1) \setminus Im(R_1) = Im(R_2) \setminus Ex(R_2)$; and $Ex(R_1) \neq Im(R_2)$ OR $Ex(R_1) \cap Im(R_1) \neq$ Empty set.

2. The method as recited in claim 1, wherein the VPN network object classes are selected from the group consisting of: configuration non-specific representation of types of managed components associated with elements of the network and configuration non-specific representations of relationships among the types of managed components.

3. The method as recited in claim 2, wherein the first and second object classes are configuration non specific representations of types of managed components.

4. The method as recited in claim 3, wherein the configuration non-specific representations of types of managed components are selected from the group consisting of: RouteTarget, VRF, and VPN.

5. The method as recited in claim 2, wherein the relationships amongst the types of managed components is selected from the and consisting of: ImportedBy/Imports, ExportedBy/Exports, VPNPeer, HubsOf, SpokesOf, SendsTo/ReceivesFrom.

6. The method as recited in claim 1, wherein the type of VPN is selected from the group consisting of: Full-Mesh, Partial-Mesh, Hub-and-Spoke, and Spoke-and-Spoke.

7. The method as recited in claim 1, wherein the step of evaluating an import/export relationship comprises the step of:
determining;

$Im(R)=Ex(R)$ wherein: Im(R) is the set of second object classes imported by the first object class; and
Ex(R) is the set of second object classes exported by the first object class.

8. The method as recited in claim 1, further comprising the step of determining spoke elements, wherein said step of determining spoke elements comprises the step of: determining Ex(R.sub.1)\.Im(R.sub.1).

9. The method as recited in claim 8, wherein the VPN hub elements are the remaining members of the set of second managed components.

10. The method as recited in claim 1, further comprising the step of:
storing the determined type of network.

11. The method as recited in claim 1, further comprising the step of:
displaying the type of network.

12. The method as recited in claim 11, further comprising the step of: displaying members of the network type.

13. The method as recited in claim 1, wherein the step of evaluating an import/export relationship further comprises the step of: excluding from evaluation RouteTargets associated with a Full-Mesh Network.

14. The method as recited in claim 1, wherein the step of evaluating an import/export relationship further comprises the step of: evaluating only RouteTargets that are exported by at least one second object class that is in the import set of a selected RouteTarget.

15. An apparatus for determining a type of Virtual Private Network (VPN) represented by a model containing a plurality of object classes, the apparatus comprising:
a processor in communication with a memory, said processor executing code for:
evaluating an import/export relationship of a first one and a second one of the object classes;
identifying the network type based on the evaluated relationship;
determining:

$Im(R)=Ex(R)$ wherein: Im(R) is the set of second object classes imported by the first object class; and Ex(R) is the set of second object classes exported by the first object class; and
determining:

$Im(R_1)=Ex(R_2)$; and $Ex(R_1)\backslash Im(R_1)=Im(R_2)\backslash Ex(R_2)$; and $Ex(R_1)\neq Im(R_2)$ OR $Ex(R_1)\cap Im(R_1)\neq$ Null Set.

16. The apparatus as recited in claim 15, wherein the VPN network object classes are selected from the group consisting of: configuration non-specific representation of types of managed components associated with elements of the network and configuration non-specific representations of relationships among the types of managed components.

17. The apparatus as recited in claim 16, wherein the first and second object classes are configuration non specific representations of types of managed components.

18. The apparatus as recited in claim 17, wherein the configuration non-specific representations of types of managed components are selected from the group consisting of: RouteTarget, VRF, and VPN.

19. The apparatus as recited in claim 18, wherein the relationships amongst the types of managed components is selected from the group consisting of: ImportedBy/Imports, ExportedBy/Exports, VPNPeer, HubsOf, SpokesOf, and SendsTo/ReceivesFrom.

20. The apparatus as recited in claim 15, wherein the type of VPN is selected from the group consisting of: Full-Mesh, Partial-Mesh, Hub-and-Spoke, and Spoke-and-Spoke.

21. The apparatus as recited in claim 15, wherein the processor further executing code for determining: Ex(R.sub.1) \.Im(R.sub.1).

22. The apparatus as recited in claim 21, wherein the VPN hub elements are the remaining members of the set of second managed components.

23. The apparatus as recited in claim 15, wherein the processor further executing code for:
storing the determined type of network.

24. The apparatus as recited in claim 15, wherein the processor further executing code for:
displaying the type of network.

25. The apparatus as recited in claim 15, wherein the processor further executing code for: displaying members of the network type.

26. The apparatus as recited in claim 15, wherein the processor further executing code for: excluding from evaluation RouteTargets associated with a Full-Mesh Network.

27. The apparatus as recited in claim 15, wherein the processor further executing code for: evaluating only RouteTargets that are exported by at least one second managed component that is in the imported set of a selected RouteTarget.

28. The apparatus as recited in claim 15, further comprising an:
Input/output device in communication with the processor and the memory.

29. The apparatus as recited in claim 15, wherein the code is stored in the memory.

30. The apparatus as recited in claim 15, wherein the first object class is a RouteTarget.

31. A computer readable medium contain code thereon, the code suitable for determining a type of Virtual Private Network (VPN), which is represented as a model containing a plurality of object classes wherein the first object class is a RouteTargets, by providing instructions to a computing system for executing the steps of:
- evaluating an import/export relationship of a first one and a second one of the object classes;
- identifying the network type based on the evaluated relationship; and
- determining $$Im(R_1)=Ex(R_2); \text{ and}$$

$$Ex(R_1)\backslash Im(R_1)=Im(R_2)\backslash Ex(R_2); \text{ and}$$

$$Ex(R_1) \neq Im(R_2) \text{ OR}$$

$$Ex(R_1) \cap Im(R_1) \neq \text{Empty set}.$$

32. The computer readable medium as recited in claim 31, wherein the VPN network object classes are selected from the group consisting of: configuration non-specific representation of types of managed components associated with elements of the network and configuration non-specific representations of relationships among the types of managed components.

33. The computer readable medium as recited in claim 32, wherein the first and second object classes are configuration non specific representations of types of managed components.

34. The computer readable medium as recited in claim 33, wherein the configuration non-specific representations of types of managed components are selected from the group consisting of: RouteTargets, VRF, and VPN.

35. The computer-read medium as recited in claim 32, wherein the relationships amongst the types of managed components is selected from the group consisting of: ImportedBy/Imports, ExportedBy/Exports, VPNPeer, HubsOf, SpokesOf, and SendsTo/ReceivesFrom.

36. The computer readable medium as recited in claim 31, wherein the type of VPN is selected from the group consisting of: Full-Mesh, Partial-Mesh, Hub-and-Spoke, and Spoke-and-Spoke.

37. The computer readable medium as recited in claim 31, wherein the code further providing instructions to a computing system for executing the step of:
- determining $$Im(R)=Ex(R)$$

wherein: Im(R) is the set of second object classes imported by the first object class; and
Ex(R) is the set of second object classes exported by the first object class.

38. The computer readable medium as recited in claim 31, wherein the code further providing instructions to a computing system for executing the step of: determining Ex(R.sub.1) \.Im(R.sub.1).

39. The computer readable medium as recited in claim 31, wherein the VPN hub elements are the remaining members of the set of second managed components.

40. The computer readable medium as recited in claim 31, wherein the code further providing instructions to a computing system for executing the step of:
- storing the determined type of network.

41. The computer readable medium as recited in claim 31, wherein the code further providing instructions to a computing system for executing the step of:
- displaying the type of network.

42. The computer readable medium as recited in claim 31, wherein the code further providing instructions to a computing system for executing the step of:
- displaying members of the network type.

43. The computer readable medium as recited in claim 31, wherein the code further providing instructions to a computing system for executing the step of: excluding from evaluation RouteTargets associated with a Full-Mesh Network.

44. The computer readable medium as recited in claim 31, wherein the code further providing instructions to a computing system for executing the step of: evaluating only RouteTargets that are exported by at least one second object class that is in the imported set of a selected RouteTarget.

* * * * *